(12) United States Patent
Baliga et al.

(10) Patent No.: US 9,262,405 B1
(45) Date of Patent: Feb. 16, 2016

(54) SYSTEMS AND METHODS OF SERVING A CONTENT ITEM TO A USER IN A SPECIFIC LANGUAGE

(71) Applicant: Google Inc., Mountain View, CA (US)

(72) Inventors: Roshan Baliga, Sunnyvale, CA (US); Noah Coccaro, Mountain View, CA (US)

(73) Assignee: Google Inc., Mountain View, CA (US)

(*) Notice: Subject to any disclaimer, the term of this patent is extended or adjusted under 35 U.S.C. 154(b) by 254 days.

(21) Appl. No.: 13/780,913

(22) Filed: Feb. 28, 2013

(51) Int. Cl.
*G06Q 30/00* (2012.01)
*G10L 21/00* (2013.01)
*G06F 17/28* (2006.01)
*G06Q 30/02* (2012.01)
*G06F 17/30* (2006.01)

(52) U.S. Cl.
CPC ............ *G06F 17/28* (2013.01); *G06Q 30/0255* (2013.01); *G06F 17/2854* (2013.01); *G06F 17/30867* (2013.01); *G06Q 30/0251* (2013.01); *G06Q 30/0256* (2013.01)

(58) Field of Classification Search
USPC .................................................. 704/2, 5, 277
See application file for complete search history.

(56) References Cited

U.S. PATENT DOCUMENTS

| | | | |
|---|---|---|---|
| 5,987,401 A * | 11/1999 | Trudeau | 704/2 |
| 6,285,978 B1 * | 9/2001 | Bernth et al. | 704/7 |
| 6,857,022 B1 | 2/2005 | Scanlan | |
| 7,548,846 B1 * | 6/2009 | Monster | 704/8 |
| 8,468,048 B2 * | 6/2013 | Agarwal et al. | 705/14.26 |
| 8,495,143 B2 * | 7/2013 | Zhou | G06Q 10/10 |
| | | | 705/14.66 |
| 2003/0216922 A1 * | 11/2003 | Gonzales et al. | 704/260 |
| 2004/0167784 A1 * | 8/2004 | Travieso et al. | 704/270.1 |
| 2005/0010419 A1 * | 1/2005 | Pourhamid | 704/277 |
| 2005/0193335 A1 | 9/2005 | Dorai et al. | |
| 2005/0216823 A1 * | 9/2005 | Petersen | G06F 17/30867 |
| | | | 715/234 |
| 2005/0261994 A1 * | 11/2005 | Lawe | 705/30 |
| 2006/0048060 A1 * | 3/2006 | Mohr et al. | 715/747 |
| 2006/0217960 A1 * | 9/2006 | Kato | G06F 17/289 |
| | | | 704/2 |
| 2006/0242013 A1 * | 10/2006 | Agarwal et al. | 705/14 |
| 2007/0294080 A1 * | 12/2007 | Bangalore | G06F 17/289 |
| | | | 704/7 |
| 2008/0088886 A1 * | 4/2008 | Silverbrook | G06F 3/0317 |
| | | | 358/403 |
| 2008/0243472 A1 * | 10/2008 | DeGroot et al. | 704/2 |
| 2008/0262827 A1 * | 10/2008 | DeGroot | 704/3 |
| 2009/0306959 A1 * | 12/2009 | Rappoport et al. | 704/2 |
| 2010/0217673 A1 * | 8/2010 | Vandewalle | G06F 9/4448 |
| | | | 705/14.64 |
| 2010/0287049 A1 * | 11/2010 | Rousso | G06Q 30/0255 |
| | | | 705/14.53 |
| 2011/0288917 A1 * | 11/2011 | Wanek et al. | 705/14.5 |

* cited by examiner

*Primary Examiner* — Richard Zhu
(74) *Attorney, Agent, or Firm* — Fish & Richardson P.C.

(57) ABSTRACT

Systems and methods of serving a content item to a user in a specific language are provided. An electronic document can be provided to a computing device over a network. A request to translate the electronic document from a first language to a second language can be received from the computing device. A language parameter for the computing device can be stored based on the request to translate the electronic document. A request for a content item to be provided to the computing device can be received. A content item can be selected from a content item database based on the stored language parameter and a geographic parameter indicating the content item is relevant to a geographic area local to the computing device. The content item can be provided to the computing device over the network.

20 Claims, 5 Drawing Sheets

| Client Identifier | Language Parameters | Proficiency Level | Number of Requests | Geographic Parameter | Turn-Off Parameter |
|---|---|---|---|---|---|
| 172.16.254.1 | English | 3 | 15 | Germany | 0 |
| | German | 2 | 0 | | |
| | French | 1 | 0 | | |
| 187.12.216.3 | Japanese | 3 | 3 | India | 1 |
| | Italian | 2 | 2 | | |
| 192.168.0.1 | Spanish | 3 | 0 | Spain | 1 |

| Client Identifier | Language Parameters | Proficiency Level | Number of Requests | Geographic Parameter | Turn-Off Parameter |
|---|---|---|---|---|---|
| 172.16.254.1 | English | 3 | 15 | | |
| | German | 2 | 0 | Germany | 0 |
| | French | 1 | 0 | | |
| 187.12.216.3 | Japanese | 3 | 3 | India | 1 |
| | Italian | 2 | 2 | | |
| 192.168.0.1 | Spanish | 3 | 0 | Spain | 1 |

FIG. 3

SYSTEMS AND METHODS OF SERVING A CONTENT ITEM TO A USER IN A SPECIFIC LANGUAGE

BACKGROUND

In an Internet based content delivery system, content can be directed towards users. However, content, such as search engine results, may be served to a user unlikely to comprehend the content.

SUMMARY

Aspects and implementations of the present disclosure are directed to systems and methods of serving a content item to a user in a language the user understands.

At least one aspect is directed to a method of serving a content item to a user in a specific language. The method includes providing, via a network interface device, an electronic document to a computing device over a network. The method includes receiving, from the computing device, a request to translate the electronic document from a first language to a second language. The method includes storing, in a memory device, a language parameter for the computing device based on the request to translate the electronic document. The method includes receiving a request for a content item to be provided to the computing device. The method includes selecting a content item from a content item database based on the stored language parameter and a geographic parameter indicating the content item is relevant to a geographic area local to the computing device. The method includes providing the content item to the computing device over the network.

At least one aspect is directed to a system for serving a content item to a user in a specific language. The system includes a data processing system having at least one of a language translation module and a user profile module. The data processing system is configured to provide, over a network, an electronic document to a computing device. The data processing system is configured to receive, from the computing device, a request to translate the electronic document from a first language to a second language. The data processing system is configured to store, in a memory device, a language parameter for the computing device based on the request to translate the electronic document. The data processing system is configured to receive a request for a content item to be provided to the computing device. The data processing system is configured to select a content item from a content item database based on the stored language parameter and a geographic parameter indicating the content item is relevant to a geographic area local to the computing device. The data processing system is configured to provide the content item to the computing device over the network.

At least one aspect is directed to a computer readable storage medium having instructions encoded thereon that when executed by one or more processors cause the one or more processors to perform a method of serving a content item to a user in a specific language. The method includes providing, via a network interface device, an electronic document to a computing device over a network. The method includes receiving, from the computing device, a request to translate the electronic document from a first language to a second language. The method includes storing, in a memory device, a language parameter for the computing device based on the request to translate the electronic document. The method includes receiving a request for a content item to be provided to the computing device. The method includes selecting a content item from a content item database based on the stored language parameter and a geographic parameter indicating the content item is relevant to a geographic area local to the computing device. The method includes providing the content item to the computing device over the network.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is depiction of a data structure that can be used to store user profile information, according to an illustrative implementation;

DETAILED DESCRIPTION

Following below are more detailed descriptions of various concepts related to, and implementations of, methods, apparatuses, and systems for serving a content item to a user in a language the user understands. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
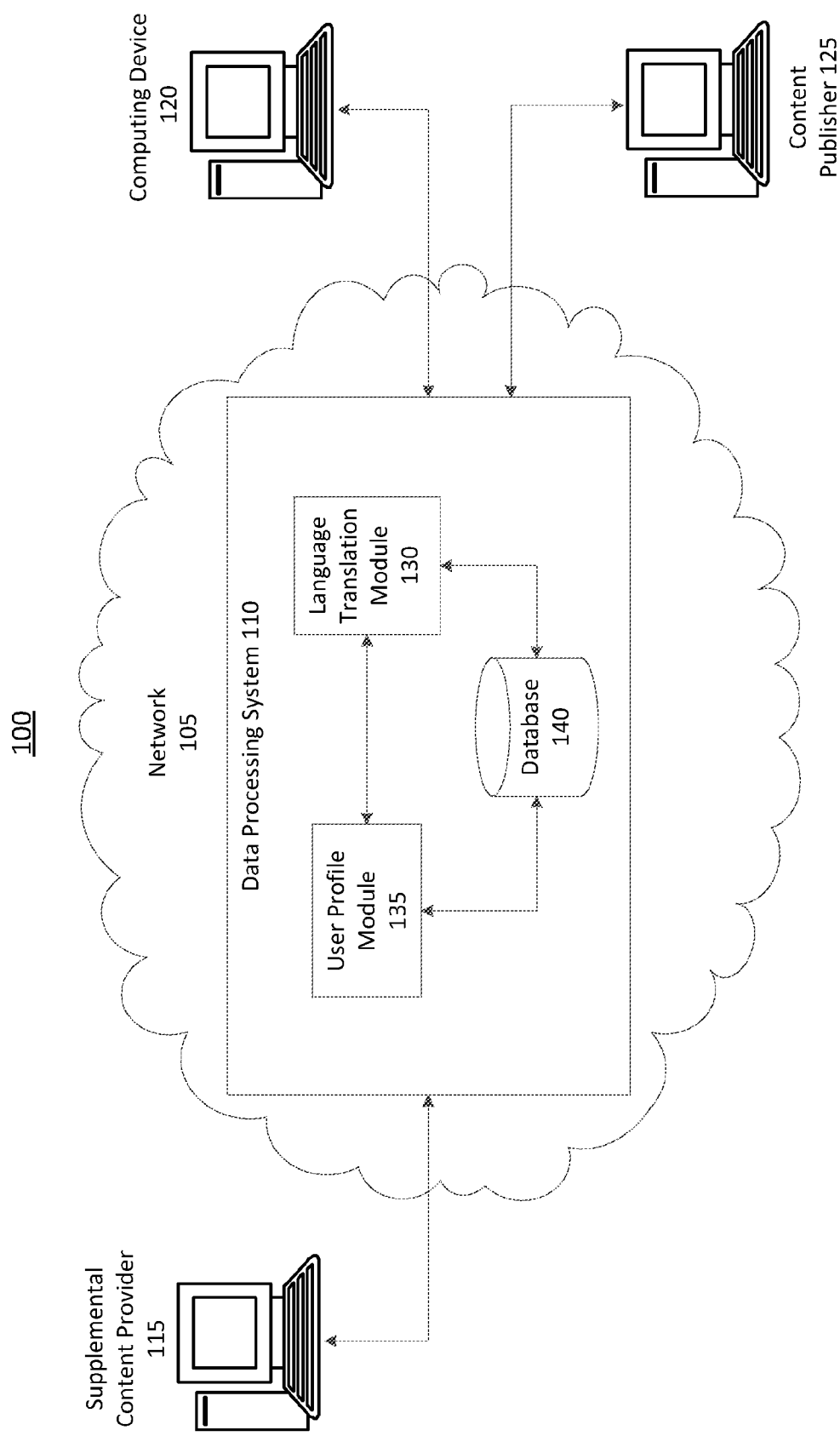
FIG. 1 is a block diagram depicting an example environment of a system for serving a content item to a user in a language the user understands, according to an illustrative implementation.

Referring now to FIG. 1, and in brief overview, an example system 100 for serving a content item to a user in a specific language is shown. As shown in FIG. 1, a computing device 120 makes requests for content from a content publisher 125 via network 105. A supplemental content provider 115 may provide additional content. The system 100 can include a data processing system 110 having a language translation module 130, a user profile module 135, and a database 140. The elements of the system 100 can communicate via a communication network 105.

The data processing system 110 can offer to translate electronic documents that are delivered to the computing device 120. Based on a user's choices regarding translation services, the data processing system 110 can determine the user's language skills and preferences. The data processing system 110 can then serve supplemental content to the computing device 120 in a specific language when the computing device 120 makes a subsequent request for an electronic document.

The network 105 can include computer networks such as the Internet, personal, local, metro, wide or other area networks, intranets, satellite networks, and other communication networks such as voice or data mobile phone communication networks. The data processing system 110 can include at least one processor or logic device to communicate via the network 105, for example with the supplemental content provider 115, the user computing device 120, the content publisher 125, and at least one database 140 such as a memory unit configured to store data, information, or instructions that can be accessed or retrieved by the data processing system.

The supplemental content provider 115 can include a server or computing device to make available content such as advertisements, applications, keywords, index terms, selection criteria, or other data for delivery via the network 105 to the computing device 120. The data processing system 110 can detect a request for content from the computing device 120 (e.g., a request for content provided by content publisher 125), and can respond by delivering content for display at the computing device 120. For example, the content publisher 125 can include a website operator having a web server. In one implementation, the computing device 120 communicates with the content publisher 125 to request display of a webpage created by the content publisher 125 at the computing device 120. In one implementation, the computing device 120 can execute a web browser application. A user of the computing device 120 can request content from content publisher 125 by entering into the web browser application a uniform resource locator (URL) corresponding to the website operated by content publisher 125. In another implementation, a user of the computing device 120 can request content from content publisher 125 by clicking on a hyperlink associated with the website operated by content publisher 125. For example, a hyperlink can be displayed on a search engine results page or can be embedded in a related web page.

The data processing system 110 can include at least one server. For example, the data processing system 110 can include a plurality of servers located in at least one data center. In one implementation, the data processing system 110 includes a content placement system. In some implementations, the content supplied by content publisher 125 or supplemental content provider 115 can be hosted on the one or more servers within the data processing system 110. The request for content from the computing device 120 can be received by the data processing system 110, and the data processing system 110 can respond to the request by serving the requested content for display at the computing device 120 via the network 105. Alternatively, the requested content can be hosted directly by the content publisher 125. The data processing system 110 can then redirect the request to the content publisher 125. The requested content can then be received by the data processing system 110 from the content publisher 125 and the data processing system can deliver the requested content to the computing device 120.

The computing device 120 can be any type of device capable of requesting and receiving electronic content over the network 105. For example, the computing device 120 can include a desktop or laptop computer, a tablet computer, a television or set top box, or a handheld personal computer such as a smartphone. In some implementations, the data processing system 110 can configure content for display at the computing device 120 based on the characteristics of the computing device 120, such as its screen size and resolution or its available input and output devices.

The data processing system 110 can also include at least one language translation module 130, at least one user profile module 135, and at least one database 140. The language translation module 130 and the user profile module 135 can each include at least one processing unit or other logic device such as programmable logic arrays, logic circuits, circuits, or other application specific integrated circuits configured to execute computer readable instructions and to communicate with the database 140. The language translation module 130 and the user profile module 135 can be separate components, a single component, or part of the data processing system 110. The language translation module 130 and the user profile module 135 can each include an engine or module having a logic device (e.g., a processor) configured to execute the implementations described herein. In one implementation, the database 140 includes at least one memory unit having processor executable instructions that, when executed by a processor of the data processing system 110, can cause the processor to implement the operations described herein.

The data processing system 110 can receive information from the supplemental content provider 115 via the network 105. For example, the supplemental content provider 115 can include a computing device operated by a person, a merchant, or a representative of a company to provide content to the data processing system 110 for display at the computing device 120. The data processing system 110 can receive multiple content items from the supplemental content provider 115. The data processing system 110 can receive content configured for display at the computing device 120 from any number of content providers 115. Supplemental content provider 115 can include at least one server for hosting supplemental content. The data processing system 110 can request supplemental content from the supplemental content provider 115. When the supplemental content has been received at the data processing system 110, the data processing system 110 can deliver the supplemental content to the computing device 120. In some implementations, the supplemental content can be stored by the data processing system 110, for example in the database 140. A supplemental content item such as an application, advertisement, or other content item can be displayed at least once on computing device 120.

In one implementation, the computing device 120 can request an electronic document supplied by the content publisher 125 via the network 105. For example, the computing device 120 can request access to a website created by content publisher 125. The request can be received by the data processing system 110, which can fulfill the request by delivering the website for display at the computing device 120 over the network 105.

The content requested by computing device 110 can include text in any language. In some instances, a user of computing device 120 may not understand the language in which the electronic document is written. To help the user of computing device 120 to understand a document in a language foreign to the user, the data processing system 110 can translate the electronic document. For example, the language translation module 130 can interpret the text of the electronic document and can translate the text into a language different from its original language.

Figure 2:
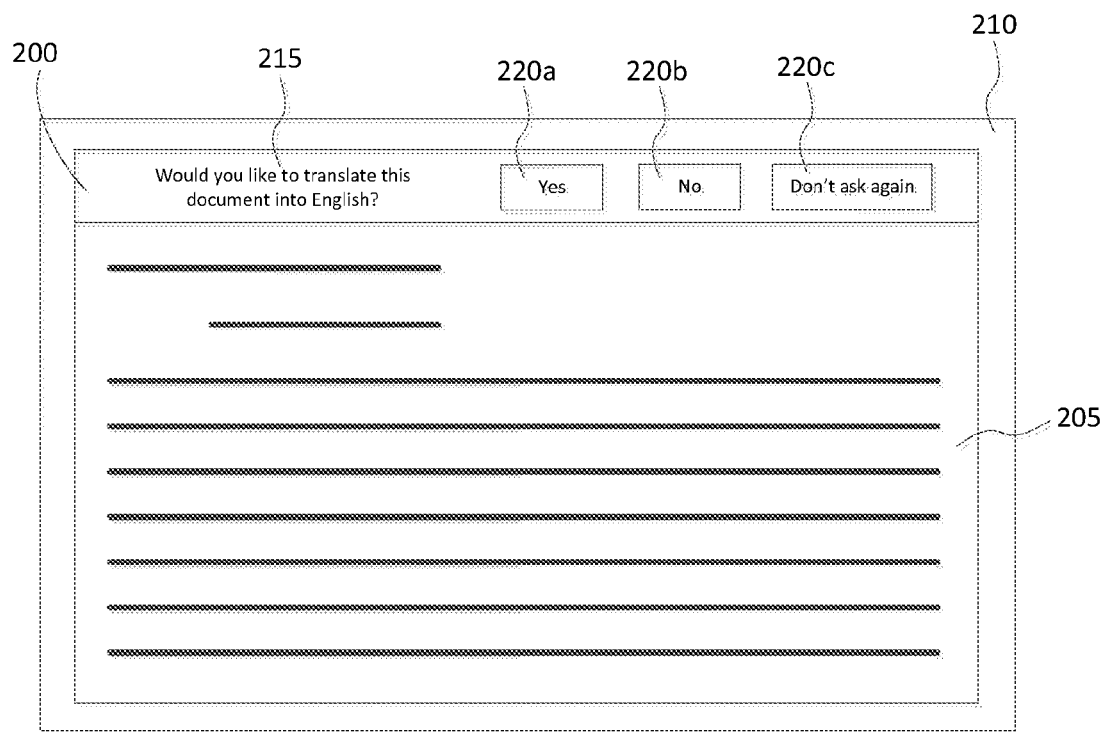
FIG. 2 is a user interface that can be displayed in a web browser window, according to an illustrative implementation.

Referring now to FIG. 2, a user interface 200 for offering to translate an electronic document 205 is shown. The electronic document 205 can be a web page having textual content, an email displayed by a web-based email application, or any other form of text-based content. The data processing system 110 of FIG. 1 can display the user interface 200 on computing device 120 when the electronic document 205 is delivered to computing device 120 for display. The user interface 200 can be displayed simultaneously with the electronic document 205 or as part of the electronic document 205. For example, the user interface 200 can be displayed at the top of a web browser window 210 in which electronic document 205 is displayed. Alternatively, the user interface 200 may be shown in other locations within the browser window 210, or as a pop-up dialog window separate from the web browser window 210.

The user interface 200 includes a number of user elements such as a prompt 215 and a plurality of selectable options 220a-220c. For example, the language translation module 130 of FIG. 1 can detect the language of the electronic document 205, and the prompt 215 can include a message asking whether the electronic document 205 should be translated into another language. In some implementations, the user interface 200 can be implemented using HTML, the ActiveX framework, or Adobe Flash programming. The user interface 200 can be programmed such that the computing device 120 of FIG. 1 can interact with the user interface 200. For example, when an input device of the computing device 120, such as a mouse or keyboard, is used to select any of the selectable options 220a-220c, the data processing system 110 can receive information corresponding to the selection. The selection can then be received and stored by the data processing system 110. For example, if the data processing system 110 of FIG. 1 receives notification that option 220a is selected indicating that the user would like to translate the electronic document 205, the language translation module 130 can respond by translating the text of the electronic document 205. In some implementations, the language translation module 130 can accomplish the translation implementing a dictionary lookup function. For example, the database 140 can store a list of words in a first language and corresponding words in a second language. The translation module 130 can then replace each word of the electronic document 205 with a word having the same meaning in the second language. The data processing system 110 can deliver the translated text for display at the computing device 120 over the network 105 and can keep a record of the selection of option 220a.

If the data processing system 110 receives notification that option 220b was selected, indicating that the user does not wish to translate the electronic document 205, the data processing system can remove the user interface 200 from the web browser 210 without translating the text of the electronic document 205. For example, a script used to create the interface 200 can be terminated, such that the electronic document 205 remains displayed on the computing device 120 while the user interface 200 is removed. Similarly, if the data processing system 110 receives notification that option 220c was selected, the data processing system can remove the user interface 200 from the web browser 210 without translating the text of the electronic document 205 and can refrain from displaying the user interface 200 on electronic documents delivered to computing device 120 in the future.

Referring again to FIG. 1, the data processing system 110 can also include a user profile module 135 for creating, modifying, or storing information associated with computing device 120. For example, the data processing system can deliver electronic documents to the computing device 120, along with an interface offering to translate the documents, as described above in connection with FIG. 2. The user profile module 135 can receive a response from the computing device 120 when a user interacts with the interface, and can use the response to create or modify the user profile for the computing device 120.

Referring now to FIG. 3, a depiction of a data structure 300 for storing user profiles is shown. The data structure 300 can be stored by the data processing system 110, for example as an expandable array, a linked list, a vector, or a table in the database 140. User profile module 135 can create a new profile in the data structure 300 for the computing device 120, or can determine that a profile for the computing device 120 already exists. For example, each user profile stored in the data structure 300 can include a unique identifier 302, such as an IP address, a telephone number, or a cookie data file. User profile module 135 can determine the identifier 302 by examining a cookie data file received from computing device 120. After receiving the translation option selection from computing device 120, user profile module 135 can search through each of the profiles stored in the data structure 300. If one of the existing profiles has an identifier 302 that matches the identifier from computing device 120, user profile module 135 can determine that a profile for computing device 120 already exists. Alternatively, if there is no existing user profile with a matching identifier 302, user profile module 135 can determine that a profile for computing device 120 does not yet exist and can create a new profile for computing device 120, for example by inserting information into the data structure 300 corresponding to the new profile.

A profile created by user profile module 135 can store information associated with the computing device 120 or with the user of the computing device 120. For example, in addition to the unique identifier 302, the profile created by user profile module 135 can include information about the languages 304 understood by a user of computing device 120, a proficiency 306 associated with each language, a number of requests 308 to translate content into the language, a geographic parameter 310, and a turn-off parameter 312. The user profile module 135 can update the user profile for the computing device 120 in response to the network activity of computing device 120.

In some implementations, the data processing system 110 can serve multiple electronic documents to computing device 120 over a period of time. For each electronic document, the language translation module 130 can determine the language of text in the document. The user profile module 135 can use this information to modify the profile for the computing device 120. For example, the user profile module can assign a relatively high value to the proficiency for a given language in response to computing device 120 requesting a large number of electronic documents written in that language. The proficiency level 306 can be a numeric score indicating how well the user understands a given language. For example, in some implementations the proficiency level 306 is an integer from 1 to 3, with a value of 1 indicating the lowest level of proficiency and a value of 3 indicating the highest level of proficiency.

In some implementations, the user profile module 135 can assess the proficiency level for a language based on the number of requests initiated by computing device 120 to translate an electronic document into that language. For example, if a computing device 120 makes a large number of requests to translate documents from other languages into Japanese, the user profile module 135 can record the number of translation requests in the user profile. The user profile module 135 can also determine that the user of computing device 120 likely has a high level of understanding of Japanese, and can assign a high value for the proficiency level 306 associated with Japanese. The user profile module 135 can also adjust the proficiency level associated with a language based on the language complexity in electronic documents displayed on computing device 120. For example, the language translation module 130 can evaluate the complexity of language in a document delivered to computing device 120. Alternatively, the content publisher 125 can select a level of complexity for the electronic document. If the user of computing device 120 chooses to translate documents having a high complexity in a given language, but does not choose to translate documents having an intermediate complexity in the same language, the user profile module can assign an intermediate value to the proficiency level for that language in the user profile corresponding to computing device 120. Similarly, if the user chooses to translate documents having a low complexity, the user profile module 135 can determine that the user has a low level of proficiency in the language, and can update the corresponding user profile accordingly.

In some implementations, the user profile module 135 can also determine a geographic parameter 310 that may be relevant to the computing device 120, and can store the geographic parameter 310 in the data structure 300. For example, the user profile module 135 can include in a user profile the country or region where the computing device 120 is located. If there is a lack of other information about the computing device 120, the user profile module 135 can determine the likely language skills of a user based on the location of the computing device 120. For example, the user profile module 135 can assign a high value to the proficiency level for Spanish if the computing device 120 is located in Spain, even if the computing device 120 has not requested a large number of electronic documents in Spanish.

The user profile module 135 can also store a turn-off parameter 312 in a user profile. In some implementations, the turn-off parameter 312 can be a binary value indicating whether the user is interested in language translation services. As discussed above, the data processing system 110 can display the user interface 200 at computing device 120 and the user can select option 220c, which indicates that the user is not interested in translation services. The user profile module 135 can then assign a value of 1 to the turn-off parameter 312 for computing device 120. When fulfilling subsequent requests for electronic documents from computing device 120, the data processing system can examine the turn-off parameter 312 stored in the user profile for computing device 120. If the turn-off parameter 312 has a value of 1, the data processing system can refrain from offering to translate the electronic document.

In some implementations, the user profile module 135 can receive network activity from the computing device 120 over a predetermined period of time. For example, the browser history data received by user profile module 135 may indicate those web pages displayed on computing device 120 within the past half hour, day, week, month, year, etc. If network activity from computing device 120 has been stored in database 140, the user profile module 135 may retrieve only data that was collected during a predetermined period of time to make determinations about the language skills and preferences of a user of computing device 120. This can help to ensure that the language information in the user profile associated with computing device 120 is current.

As described above, the data processing system 110 can receive content from supplemental content provider 115. When computing device 120 requests content from content publisher 125, the content from supplemental content provider 115 can be provided along with the requested content. In some implementations, content publisher 125 will request that a supplemental content item be delivered to computing device 120 along with the electronic document. The request for supplemental content can be received by the data processing system 110. The data processing system 115 can receive supplemental content items from any number of supplemental content providers 115. In some implementations, the supplemental content items can be stored in the data processing system 110, for example in the database 140.

The data processing system 110 can use the user profile to select a supplemental content item to be served to the computing device 120. For example, the data processing system 110 can determine from the user profile that the computing device 120 is located in Germany, but that the user of the computing device 120 is not proficient in German. In this instance, the data processing system 110 can choose to serve a supplemental content item that is not written in the local language (i.e., German), but is instead written in a different language. Thus, the supplemental content item can be served in a different language than the electronic document with which it is displayed. In this example, if the data processing system 110 determines that supplemental content items should be delivered to the computing device 120 in English, the data processing system 110 may select a supplemental content item that was originally received in English from supplemental content provider 115, and may serve this content item for display at the computing device 120. Alternatively, the data processing system 110 may select a supplemental content item that was originally received in German (or any other language) from supplemental content provider 115, and may use the language translation module 130 to translate the supplemental content item into English. The translated supplemental content item can then be delivered to the computing device 120 for display.

In other implementations, the data processing system 110 can select a supplemental content item based on the local language, even if the user profile for computing device 120 indicates that the user is more proficient in a different language. For example, the supplemental content provider 115 may prefer that the content be shown in its original language. It may also be difficult to accurately translate the language from the content item into the user's preferred language, (e.g., the content item may include complex language or proper nouns). In some implementations, a supplemental content item can include an associated geographic parameter selected by the supplemental content provider 115.

Delivering the supplemental content item in its original language can also avoid the possibility of inaccurate translations, which could be misleading to the user of computing device 120. However, even if the supplemental content item is delivered in a language other than the user's preferred language, the data processing system 110 can use information from the user profile to improve the probability that the user will understand the language of the supplemental content item. For example, the data processing system 110 can serve to the computing device 120 a supplemental content item whose language is below a threshold level of complexity based on the user's proficiency. In some implementations, the language translation module 130 can determine the level of complexity of the supplemental content item. In other implementations, the supplemental content provider can include an indication of the level of complexity in the supplemental content, which can be stored by the data processing system.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 4:
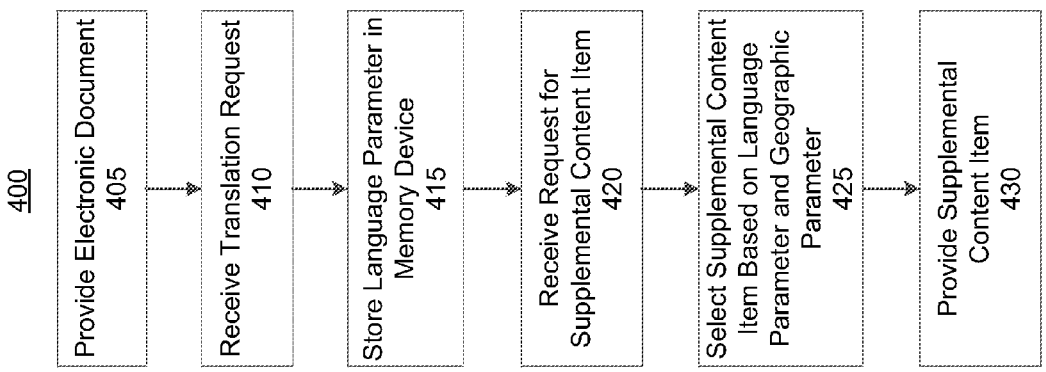
FIG. 4 is a flow chart of a method of serving a content item to a user in a language the user understands, according to an illustrative implementation.

Referring now to FIG. 4, and in brief overview, a flow diagram is shown depicting a method 400 of serving a content item to a user in a specific language. The method 400 includes the steps of providing an electronic document (Step 405), receiving a translation request (Step 410), storing a language parameter in a memory device (Step 415), receiving a request for a supplemental content item (Step 420), selecting the supplemental content item based on the language parameter and a geographical parameter (Step 425), and providing the content item (Step 430).

Referring again to FIG. 4, and in greater detail, the method 400 includes the step of providing an electronic document (Step 405). A computing device can submit a request for an electronic document, such as a website or an email. For example, a user of the computing device can make a request by entering a uniform resource locator (URL) into a web browsing program, or by clicking on a hyperlink on a webpage. A data processing system can respond to the request by delivering the requested content for display at the computing device.

The method 400 also includes the step of receiving a translation request (Step 410). The electronic document served to the computing device can include text in any language. In some instances, the user of the computing device may not understand the language in which the electronic document is written. For example, the user may comprehend only Dutch and Spanish, but may request an electronic document with Japanese text. The data processing system can then offer to translate the text into a language that the user understands, for example by displaying a user interface prompting the user to select whether or not he would like to have the document translated. If the user chooses to have the document translated, the data processing system can receive the request to translate the document, and can then serve a translated version of the document for display to the user. For example, the data processing system can include a language translation module configured to translate text from a first language into a second language. Alternatively, the user can choose not to translate the document, in which case the data processing system will not translate the document. The user may also choose not to have translation services offered in connection with future requests for electronic documents.

The method 400 includes the step of storing a language parameter in a memory device (Step 415). A language parameter can be stored based on the translation request received in Step 410. In some instances, more than one language parameter can be stored. Language parameters can include language proficiencies, requests to translate text into a language, geographic parameters, or turn-off parameters to indicate that the user does not wish to receive translation services in the future. In some implementations, the language parameter can be stored in a user profile.

The user profile can include a client identifier associated with the computing device and a plurality of language parameters. For example, if the user of the computing device chooses to translate a document from Portuguese into Mandarin, language parameters relating to this request can be stored in the user profile associated with the computing device. In this example, it is likely that the user understands Mandarin but does not understand Portuguese, so a high proficiency associated with Mandarin can be stored in the user profile, and a low proficiency associated with Portuguese can be stored in the user profile. Similarly, if the user requests the Portuguese document and does not choose to translate it, a high proficiency can be stored and associated with Portuguese. Activity relating to subsequent requests for electronic documents can also be stored in the user profile. For example, subsequent network activity of the computing device can indicate that the user has varying levels of understanding of other languages, and corresponding proficiency levels can be stored for these additional languages in the user profile.

Other information can also be stored in the user profile. For example, a geographic parameter can be stored in the user profile based on the country or region in which the computing device is located. If the user chooses not to have translation services offered in the future, a turn-off parameter can be stored in the profile, indicating that the data processing system should not prompt the user with an offer to translate text during a subsequent browsing session.

The method 400 includes the step of receiving a request for a supplemental content item (Step 420). In some instances, the publisher of the requested electronic document may request that supplemental content be delivered to the computing device along with the electronic document. For example, the content publisher may request that supplemental content be displayed at the computing device in a predetermined location in the electronic document. The content publisher can also request that supplemental content be displayed in a separate pop-up window that is created when the electronic document is displayed on the computing device. Such a request for supplemental content can be received by the data processing system.

The method 400 includes the step of selecting a supplemental content item based on a language parameter and a geographical parameter (Step 425). Supplemental content items may be received by the data processing system from many different supplemental content providers. The supplemental content items can be stored by the data processing system, for example in a database associated with the data processing system, and can later be retrieved for delivery to the computing device. The data processing system can select a supplemental content item that a user is likely to understand by selecting the supplemental content item based at least in part on the language parameters in the user profile associated with the computing device of the user.

In some implementations, the data processing system can select a supplemental content item in a language that is different from the predominant language where the computing device is located. For example, as described above in connection with Step 415, the data processing system can store a geographic parameter in the user profile. If the geographic parameter indicates that the computing device is located in Italy, but the proficiency parameter associated with Italian indicates that the user has a low level of comprehension of Italian language, the data processing system can select a supplemental content item in a language in which the user has a higher proficiency level. The data processing system may also select a supplemental content item which originally included Italian language, but which has been translated into a language that the user is more likely to understand. The translation may be performed by the data processing system.

In other implementations, the data processing system can select a supplemental content item based on the predominant language where the computing device is located. For example, as described above in connection with Step 415, the data processing system can store a geographic parameter in the user profile. If the geographic parameter indicates that the computing device is located in Italy, the data processing system can select a supplemental content item that includes Italian text. A local language supplemental content item can be selected even if the user of the computing device has greater proficiency in another language. In some implementations, the user's proficiency in the local language can be used to select the supplemental content item. For example, the data processing system can determine that the user of the computing device has a low proficiency level in the local language by referring to the user profile. In response, the data processing system can select a local language supplemental content item whose language is very basic, in order to increase the likelihood that the user will understand the text.

The method 400 also includes the step of providing the selected supplemental content item to the computing device (Step 430). The data processing system can provide the supplemental content item to the computing device along with the requested electronic document. For example, the publisher of the electronic document can provide space within the electronic document for supplemental content supplied by a supplemental content provider, and the data processing system can configure the supplemental content item for display in the reserved space of the electronic document. The data processing system can then provide the electronic document and the supplemental content item to the computing device for display. Alternatively, the data processing system can deliver the supplemental content in a browser window that is created separately from the browser window displaying the requested electronic document. In some implementations, the supplemental content provider can be different from the content publisher.

Figure 5:
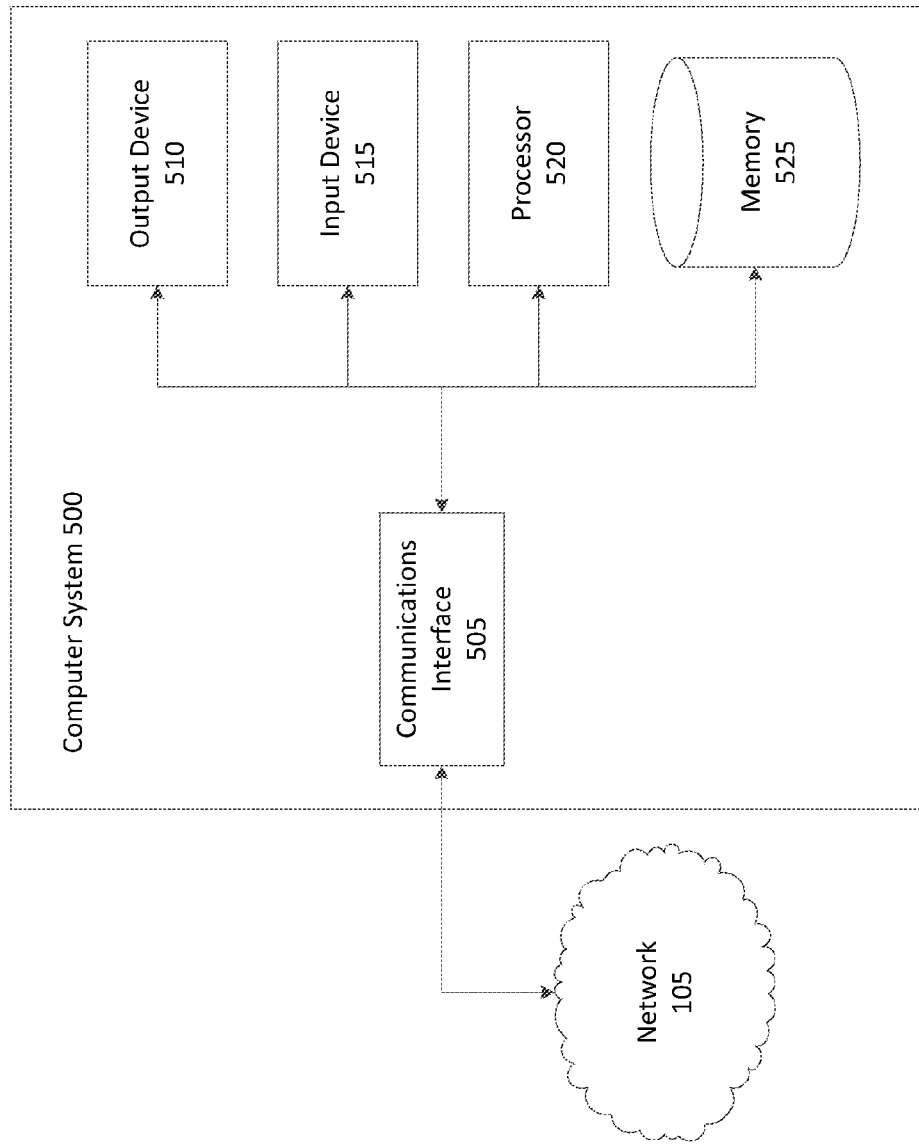
FIG. 5 is a block diagram illustrating a general architecture for a computer system that may be employed to implement various elements of the systems and methods described and illustrated herein, according to an illustrative implementation.

FIG. 5 shows the general architecture of an illustrative computer system 500 that may be employed to implement any of the computer systems discussed herein (including the data processing system 110 of FIG. 1 and its components such as language translation module 130, the user profile module 135, and the database 140) in accordance with some implementations. The computer system 500 can be used to translate an electronic document and create a user profile storing information corresponding to the language preferences of a user on the computer network 105. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the language translation module 130, the user profile module 135, or the other components of the data processing system 110.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the data processing system 110 of FIG. 1, the language translation module 130 or the user profile module 135 can include the memory 525 to store the user profile of the computing device 120, as well as the information used to provide translation services and generate the user profile. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 500. Examples of communications interfaces 505 include user interfaces (e.g., web pages) having content supplied by the content publisher 125 or the supplemental content provider 115 and requested by the computing device 120.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The language translation module 130 and the user profile module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 100 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results. In some implementations, additional steps may be added to the processes shown in the accompanying figures, or different processes may be substituted to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the language translation module 130, the user profile module 135, and the database 140 can be a integrated into single module, a logic device having one or more processing circuits, or part of a search engine. In addition, the functionality of the components and systems described herein can be combined. For example, in some implementations functionality described in connection with the language translation module 130 can be implemented by the user profile module 135, or vice versa.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   providing, via a network interface device, a first electronic document to a computing device over a network;
   responsive to a request by a user to translate the first electronic document from a first language to a second language:
   obtaining a second electronic document in the second language, the second electronic document being a translation of the first electronic document in the first language;

obtaining a content item to be provided to the computing device for display with the second electronic document, the content item being different from the first electronic document and in a language different from the second language, including:

selecting the content item from a content item database based on a language parameter indicating a language proficiency of the user submitting the translation request, the language proficiency being assessed based on past translation requests submitted by the user, and a geographic parameter indicating the content item is relevant to a geographic area local to the computing device; and providing the second electronic document and the content item to the computing device for presentation to a user over the network.

2. The method of claim 1, wherein the first electronic document is an email and the second electronic document is a webpage.

3. The method of claim 1, wherein the first electronic document is displayed on the computing device with a user interface having a first user input element, wherein the first user input element, when selected by a user, generates the request to translate the first electronic document from the first language to the second language.

4. The method of claim 3, wherein the user interface comprises a second user input element, wherein the second user input element, when selected by a user, hides the user interface from being displayed with future electronic documents provided to the computing device.

5. The method of claim 1, wherein the language proficiency is assessed based on a frequency of a language into which the user has requested documents to be translated, as specified in the past translation requests submitted by the user.

6. The method of claim 1, wherein the language proficiency is assessed based on a frequency of a language from which the user has requested documents to be translated, as specified in the past translation requests submitted by the user.

7. The method of claim 1, wherein the language proficiency is assessed based on language complexities of documents for which the user has requested translation, as specified in the past translation requests submitted by the user.

8. The method of claim 1, further comprising calculating a complexity score for the content item representing complexity of language used in the content item and, if the complexity score indicates that the language is less complex than a predetermined threshold, selecting the content item in the first language for providing to the computing device.

9. The method of claim 1, further comprising selecting the content item from a first content item advertising a product using language having a first complexity and a second content item advertising the same product using language having a second complexity less than the first complexity.

10. The method of claim 9, wherein each of the first and second content items has a complexity previously selected by a provider of the content item.

11. A system for providing a content item to a user in a specific language, comprising:

a data processing system having at least one of a language translation module and a user profile module, the data processing system configured to:

providing, via a network interface device, a first electronic document to a computing device over a network;

responsive to a request by a user to translate the first electronic document from a first language to a second language:

obtain a second electronic document in the second language, the second electronic document being a translation of the first electronic document in the first language;

obtain a content item to be provided to the computing device for display with the second electronic document, the content item being different from the first electronic document and in a language different from the second language, including:

selecting the content item from a content item database based on a language parameter indicating a language proficiency of the user submitting the translation request, the language proficiency being assessed based on past translation requests submitted by the user, and a geographic parameter indicating the content item is relevant to a geographic area local to the computing device, the content item being in the second language, and the second electronic document being in a language different from the second language; and provide the second electronic document and the content item to the computing device for presentation to a user over the network.

12. The system of claim 11, wherein the first electronic document is displayed on the computing device with a user interface having a first user input element, wherein the first user input element, when selected by a user, generates the request to translate the first electronic document from the first language to the second language.

13. The system of claim 12, wherein the user interface comprises a second user input element, wherein the second user input element, when selected by a user, hides the user interface from being displayed with future electronic documents provided to the computing device.

14. The system of claim 11, wherein the language proficiency is assessed based on a frequency of a language into which the user has requested documents to be translated, as specified in the past translation requests submitted by the user.

15. The system of claim 11, wherein the language proficiency is assessed based on a frequency of a language from which the user has requested documents to be translated, as specified in the past translation requests submitted by the user.

16. The system of claim 11, wherein the language proficiency is assessed based on language complexities of documents for which the user has requested translation, as specified in the past translation requests submitted by the user.

17. The system of claim 11, wherein the data processing system is further configured to calculate a complexity score for the content item representing complexity of language used in the content item and, if the complexity score indicates that the language is less complex than a predetermined threshold, select the content item in the first language for providing to the computing device.

18. The system of claim 11, wherein the data processing system is further configured to select the content item from a first content item advertising a product using language having a first complexity and a second content item advertising the same product using language having a second complexity less than the first complexity.

19. The system of claim 18, wherein each of the first and second content items has a complexity previously selected by a provider of the content item.

20. A non-transitory computer readable storage device having instructions encoded thereon that when executed by one or more processors cause the one or more processors to perform operations comprising:
- providing, via a network interface device, a first electronic document to a computing device over a network;
- responsive to a request by a user to translate the first electronic document from a first language to a second language:
  - obtaining a second electronic document in the second language, the second electronic document being a translation of the first electronic document in the first language;
  - obtaining a content item to be provided to the computing device for display with the second electronic document, the content item being different from the first electronic document and in a language different from the second language, including:
    - selecting the content item from a content item database based on
      - a language parameter indicating a language proficiency of the user submitting the translation request, the language proficiency being assessed based on past translation requests submitted by the user, and
      - a geographic parameter indicating the content item is relevant to a geographic area local to the computing device; and
- providing the second electronic document and the content item to the computing device for presentation to a user over the network.

* * * * *